United States Patent
Drucktenhengst et al.

[11] Patent Number: 5,895,052
[45] Date of Patent: Apr. 20, 1999

[54] SHAFT SEALING DEVICE

[75] Inventors: Rolf Drucktenhengst, Lampertheim; Uwe Henrich, Otzberg, both of Germany

[73] Assignee: Firma Carl Freudenberg, Weinheim, Germany

[21] Appl. No.: 08/878,637

[22] Filed: Jun. 19, 1997

[30] Foreign Application Priority Data

Jun. 20, 1996 [DE] Germany ............... 196 24 611

[51] Int. Cl.⁶ ............... F01D 11/02; F16J 15/40; F16J 15/32
[52] U.S. Cl. ............... 277/351; 277/424; 277/560; 277/562
[58] Field of Search ............... 277/351, 551, 277/560, 562, 565, 573, 424, 571, 559, 400, 402, 423

[56] References Cited

U.S. PATENT DOCUMENTS

| | | | |
|---|---|---|---|
| 4,181,312 | 1/1980 | Douglas | 277/424 |
| 5,201,529 | 4/1993 | Heinzen | 277/351 |
| 5,350,181 | 9/1994 | Horve | 277/560 X |
| 5,553,866 | 9/1996 | Heinzen | 277/573 X |
| 5,611,548 | 3/1997 | Dahlhaus | 277/565 X |

FOREIGN PATENT DOCUMENTS 3826628  2/1990  Germany.

*Primary Examiner*—Anthony Knight
*Assistant Examiner*—Gary Grafel
*Attorney, Agent, or Firm*—Kenyon & Kenyon

[57] ABSTRACT

A device for sealing the annular gap between a housing and a shaft supported in the housing. The device comprises an inner ring, an outer ring, and an elastomeric sealing member joined to the outer ring. The sealing member has three sealing lips, of which only the first abuts, under prestressing, against the inner ring. The two other sealing lips are configured in such a way that, between their outer ends and the sections of the inner ring lying opposite to their outer ends, gaps are formed which act as a contact-free sealing. In addition, a gap may be provided between a radially extending annular disk portion of the sealing member and an outer flanged section of the inner ring axially opposite the annular disk portion. That gap and the gaps at the ends of the second and third sealing lips form a labyrinth seal.

16 Claims, 1 Drawing Sheet

SHAFT SEALING DEVICE

BACKGROUND OF THE INVENTION

The invention relates to a device for sealing an annular gap between a housing and a shaft supported in the housing.

German Patent Application DE 38 26 628 shows a prior art example of such a device. The device seals the annular gap both to prevent the escape of lubricants and to prevent the admission of impurities. In the device in German Patent Application DE 38 26 628, a first sealing lip is prestressed radially against an inner ring, in a customary manner. A second sealing lip also abuts against the inner ring, and a third sealing lip strikes against a radial section of the inner ring, the sealing lips acting as a labyrinth seal. The space between the first and the second sealing lips contains a grease packing.

Such devices are also described as cartridge seals, and they are needed when shafts with radial toothing on the front end must be guided axially through a sealing ring already inserted in the housing, and the more cost-effective rotary shaft lip seals (without an inner ring) are not usable because the danger would exist that their sealing lips would be damaged by the shaft during assembly. The comparatively soft sealing members are endangered in the case of a device without an inner ring, especially in the case of a shaft constructed at the front end as a spline shaft.

In the case of a device in accordance with the generic concept as in German Patent Application DE 38 26 628, this danger of damage to the sealing lips does not exist. Nevertheless, such a device still has a number of disadvantages.

Since the second sealing lip abuts against the inner ring only because of its inherent elasticity, the escape of grease from the space between the first and the second sealing lips cannot be completely prevented. By the rotation of the inner ring, the grease is accelerated to move toward the outside via the radial flange section and the shorter generally cylindrical section, without the third sealing lip being able to prevent it to any appreciable extent. The escaping grease not only constitutes irretrievable loss of lubricant from the system, but also pollutes the environment.

When the grease supply is used up, the second and third sealing lips operate without lubrication. This, sooner or later, leads to their destruction, both because of friction and because of heating which occurs to temperatures intolerable for the rubber material of the sealing lips.

A similar effect also occurs when, because of pressure differences developing during operation, the grease supply moves toward the inside via the first sealing lip. In this case, the third sealing lip operates without lubrication from the start, and the second sealing lip operates without lubrication as soon as only a small portion of the grease has moved toward the inside.

BRIEF DESCRIPTION OF THE INVENTION

An objective of the invention is to develop a device in accordance with the generic concept in such a way that the disadvantages described cannot occur, without losing the advantages during shaft assembly. In addition, an objective is to achieve these improvements without significant extra cost, because the components generally are manufactured in large quantities and are subject to competitive market pressures.

To fulfill these objectives, the invention described herein provides a gap between the ends of each of the second and third sealing lips and the respective sections of the inner ring lying opposite to the ends of those sealing lips, so that relative movement is possible between the inner ring and these sealing lips without contact.

In a prior art device such as that in German Patent Application DE 38 26 628, the second and third sealing lips are not operationally reliable in the long run, because sooner or later grease escapes and a dry operation occurs, causing the sealing lips to then be destroyed prematurely by friction and overheating. The sealing lips provided by this invention operate without contact, but nevertheless are sufficiently effective as a dust seal. This is especially true when another narrow sealing gap is provided between an outer flanged section of the inner ring and the radial annular disk portion of the sealing member opposite it. Dust possibly collecting between the third sealing lip and the radial annular disk portion of the sealing member can get only to the inner ring, and from it is spun off outwardly. In this manner, a triple acting labyrinth seal is created which exhibits no wear and tear due to parts rubbing against one another, and which therefore has unvarying efficacy over substantially longer operating times than prior devices. Obviously, it is also important that the air flow continuously drawn in from the sealing lip and conveyed in the direction of the sealed space during normal operation contributes to preventing the grease from escaping prematurely.

DETAILED DESCRIPTION OF THE INVENTION

Figure 1:
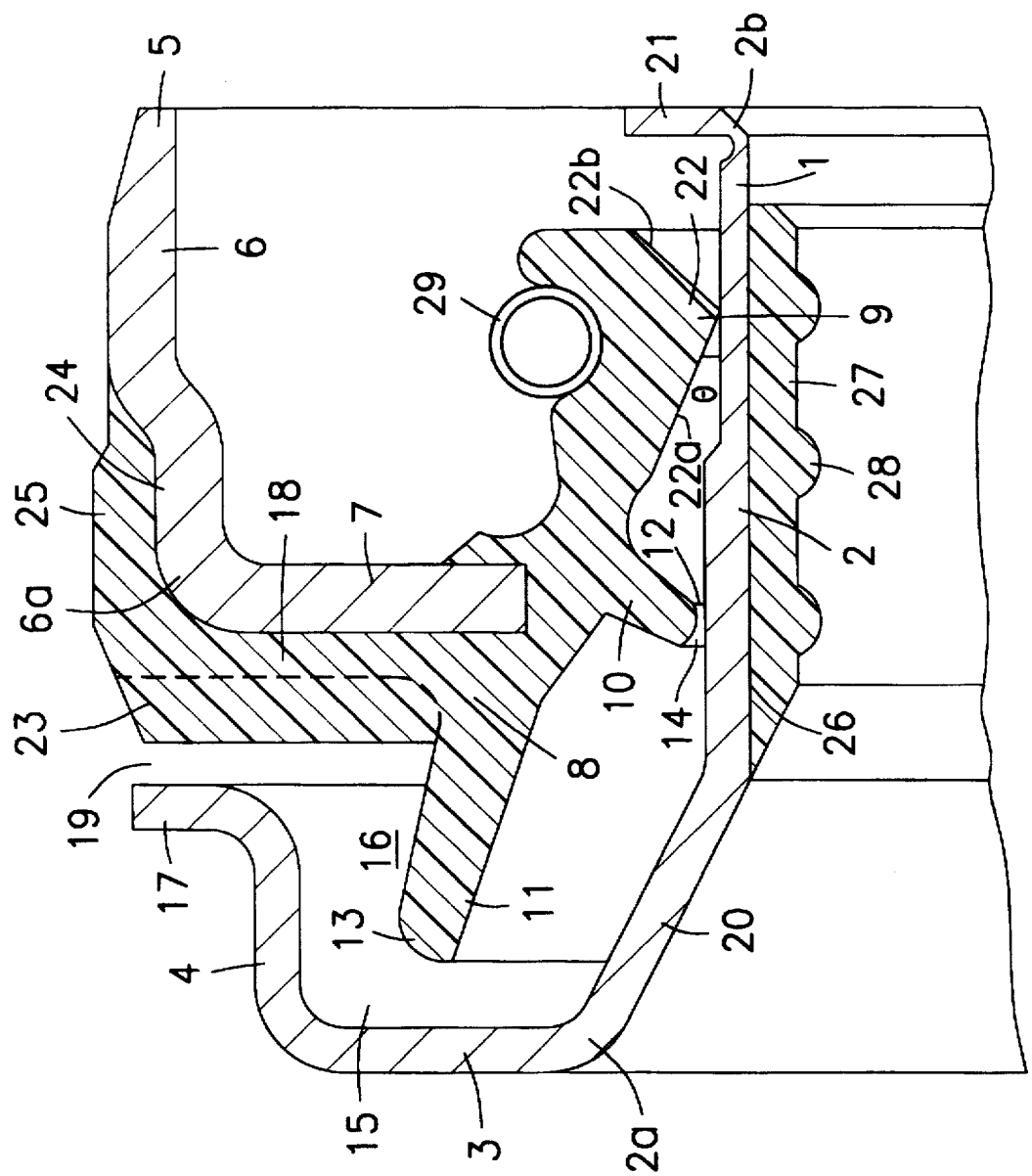
FIG. 1 shows an enlarged longitudinal sectional view through one half of a device according to the invention.

The device illustrated in FIG. 1 comprises an inner ring 1, an outer ring 5 and a sealing member 8. Inner ring 1 has a longer generally cylindrical section 2, a radial flange section 3 pointing radially outwardly, and a shorter generally cylindrical section 4. Outer ring 5 comprises a generally cylindrical section 6 and a flange section 7 pointing radially inwardly. Sealing member 8 is formed in one piece from elastomeric material and has a first sealing lip 9 which abuts under prestressing against the longer generally cylindrical section 2 of inner ring 1. Second and third sealing lips 10 and 11 are constructed on sealing member 8, with the second sealing lip 10 pointing toward the longer generally cylindrical section 2, and the third sealing lip 11 pointing toward the radial flange section 3.

Gaps 14 and 15 are provided between the ends 12, 13 of sealing lips 10, 11 and the sections of inner ring 1 opposite them, so that in this region a relative movement is possible without making contact. The second and third sealing lips 10, 11 may each have a conical shape. In the illustrated embodiment, the second sealing lip 10 has a conical shape tapering toward the axially outer end of the inner ring, and the third sealing lip 11 has a conical shape widening toward the axially outer end of the inner ring. The third sealing lip 11 juts into space 16 formed between the longer and shorter generally cylindrical sections 2, 4 of inner ring 1.

The end of the shorter generally cylindrical section 4 is bent outwardly, forming an outer flanged section 17 serving as a splash ring. Sealing member 8 has a radially extending annular disk portion 18 lying opposite the outer flanged section 17 of inner ring 1 and set apart by a gap 19. To facilitate assembly of the shaft, the longer generally cylindrical section 2 of inner ring 1 has, at its axially outer end 2a, a segment 20 widening like a cone. At its axially inner end 2b, the longer generally cylindrical section 2 of inner ring 1 has a collar 21 pointing radially outwardly, which insures that the inner and outer rings remain undetachably joined to each other from the end of the production line until installation in the housing. Instead of a circumferential collar 21, a plurality of bends pointing radially outwardly and distributed on the periphery may also be provided.

First sealing lip 9 has a wedge-shaped cross-section and has a wedge tip 22 abutting against the inner ring 1. The wedge tip 22 has an axially outer wedge surface 22a and an axially inner wedge surface 22b, with the axially outer wedge surface 22a angling away from the longer generally cylindrical section 2 of inner ring 1 at a smaller angle θ than the axially inner wedge surface 22b. Thus when inner ring 1 is rotating, a suction effect directed toward the housing interior develops between the wedge tip 22 and inner ring 1, helping to prevent the escape of lubricant.

The radially extending annular disk portion 18 of sealing member 8 has radially running indents 23 on its side facing the gap 19. This helps to prevent the entrance of dust.

On its axially outer end 6a, the generally cylindrical section 6 of the outer ring 5 has a graded region 24 having a smaller diameter. In this region, the sealing member 8 overlaps the outer ring 5, forming a region 25 having a greater outside diameter than the generally cylindrical section 6 of outer ring 5. Because of this, under compression of sealing member 8, the outer ring can be pressed into the associated housing bore hole.

The inner surface 26 of the longer generally cylindrical section 2 of inner ring 1 is provided with a firmly adhering layer 27 of elastomeric material. Inner ring 1 is likewise secured to the shaft under compression of the elastomeric material. To improve the securing effect, accompanied by easy assembling capability and good static sealing action, layer 27 can also be provided with ring-shaped projections 28 pointing inwardly.

Sealing member 8 is securely bonded to the outer ring 5 in a known manner, for example by cementing or vulcanizing. The prestressing of sealing lip 9 against the inner ring 1 is ensured in a customary manner, for example by a spring washer 29 or similar means.

In accordance with the above descriptions, a sealing device for the sealing gap between a housing and a shaft supported in the housing is provided, in which a second and third sealing lip form a dust seal acting without contact and free from wear and tear. A system of gaps, for example gaps 19, 15, and 14 in the illustrated embodiment, form a labyrinth system whose individual seals are separated from one another by buffer zones. The labyrinth system is at least as effective as the two sealing lips of the known prior art system which abut against the inner ring but which cannot be permanently protected by lubrication against wear and tear. The device according to the invention can be used with or without a grease supply and may be produced cost effectively as compared to prior devices.

What is claimed is:

1. A device for sealing an annular gap between a housing and a shaft supported in the housing, the device comprising:

an inner ring comprising a longer generally cylindrical section, a radial flange section located at an axially outer end of the longer generally cylindrical section and extending radially outwardly from the longer generally cylindrical section, and a shorter generally cylindrical section having a diameter larger than the longer generally cylindrical section and extending from the radial flange section generally in the direction of an axially inner end of the device, an outer ring comprising a generally cylindrical section and a flange section extending radially inwardly from an axially outer end of the generally cylindrical section of the outer ring, and an elastomeric sealing member joined to the outer ring, the sealing member comprising a first sealing lip which abuts under radial prestressing against the inner ring, a second sealing lip aligned toward the longer generally cylindrical section of the inner ring, and a third sealing lip aligned toward the radial flange section of the inner ring, wherein a gap is present between an end of the second sealing lip and the section of the inner ring lying opposite to it and a gap is present between an end of the third sealing lip and the section of the inner ring lying opposite to it, so that relative movement is possible between the inner ring and the second and third sealing lips without the inner ring making contact with either the second or the third sealing lip.

2. A device according to claim 1, wherein the second sealing lip has a conical shape tapering toward the axially outer end of the inner ring.

3. A device according to claim 1, wherein the third sealing lip has a conical shape widening toward the axially outer end of the inner ring.

4. A device according to claim 2, wherein the third sealing lip has a conical shape widening toward the axially outer end of the inner ring.

5. A device according to claim 1, wherein the third sealing lip extends into a space formed between the longer and shorter generally cylindrical sections of the inner ring.

6. A device according to claim 1, wherein the inner ring comprises an outer flanged section extending radially outwardly from the shorter generally cylindrical section of the inner ring.

7. A device according to claim 6, wherein the sealing member has a radially extending annular disk portion which lies opposite the outer flanged section of the inner ring, set apart by a gap.

8. A device according to claim 1, wherein the longer generally cylindrical section of the inner ring has at its axially outer end a segment widening like a cone.

9. A device according to claim 1, wherein the longer generally cylindrical section of the inner ring has at its axially inner end a portion extending radially outwardly.

10. A device according to claim 1, wherein the first sealing lip has a wedge-shaped cross-section with a wedge-tip abutting against the inner ring.

11. A device according to claim 10, wherein an axially outer wedge surface angles away from the longer generally cylindrical section of the inner ring at a flatter angle than an axially inner wedge surface.

12. A device according to claim 7, wherein the radially extending annular disk portion of the sealing member has indents running radially on its side facing the gap between the radially extending annular disk portion and the outer flanged section of the inner ring.

13. A device according to claim 1, wherein the generally cylindrical section of the outer ring has at its axially outer end a graded region having a smaller diameter than the diameter of the axially inner end of the generally cylindrical section of the outer ring.

14. A device according to claim 13, wherein the sealing member overlaps the graded region and in that overlap region has a greater outside diameter than the generally cylindrical section of the outer ring.

15. A device according to claim 1, further comprising a layer of elastomeric material on the inner surface of the longer generally cylindrical section of the inner ring.

16. A device according to claim 15, wherein the layer of elastomeric material has ring-shaped projections pointing inwardly.

* * * * *